May 12, 1942.  E. E. LINDSEY  2,282,662
PROCESS AND APPARATUS FOR THE PREPARATION OF FROZEN CONFECTIONS
Filed Feb. 9, 1938  2 Sheets-Sheet 1
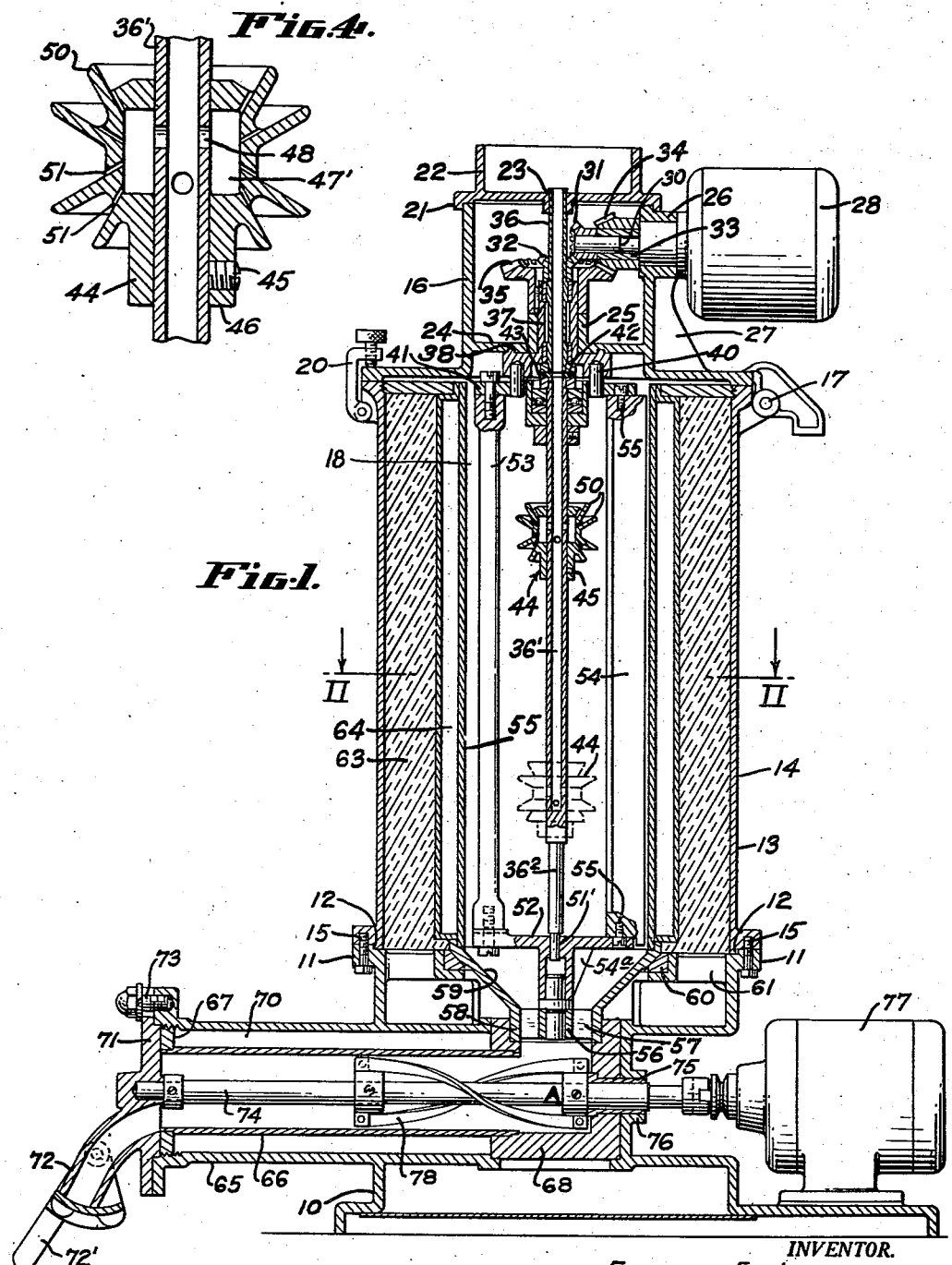
INVENTOR.
ERNEST E. LINDSEY
BY Henry Gifford Hardy
ATTORNEY

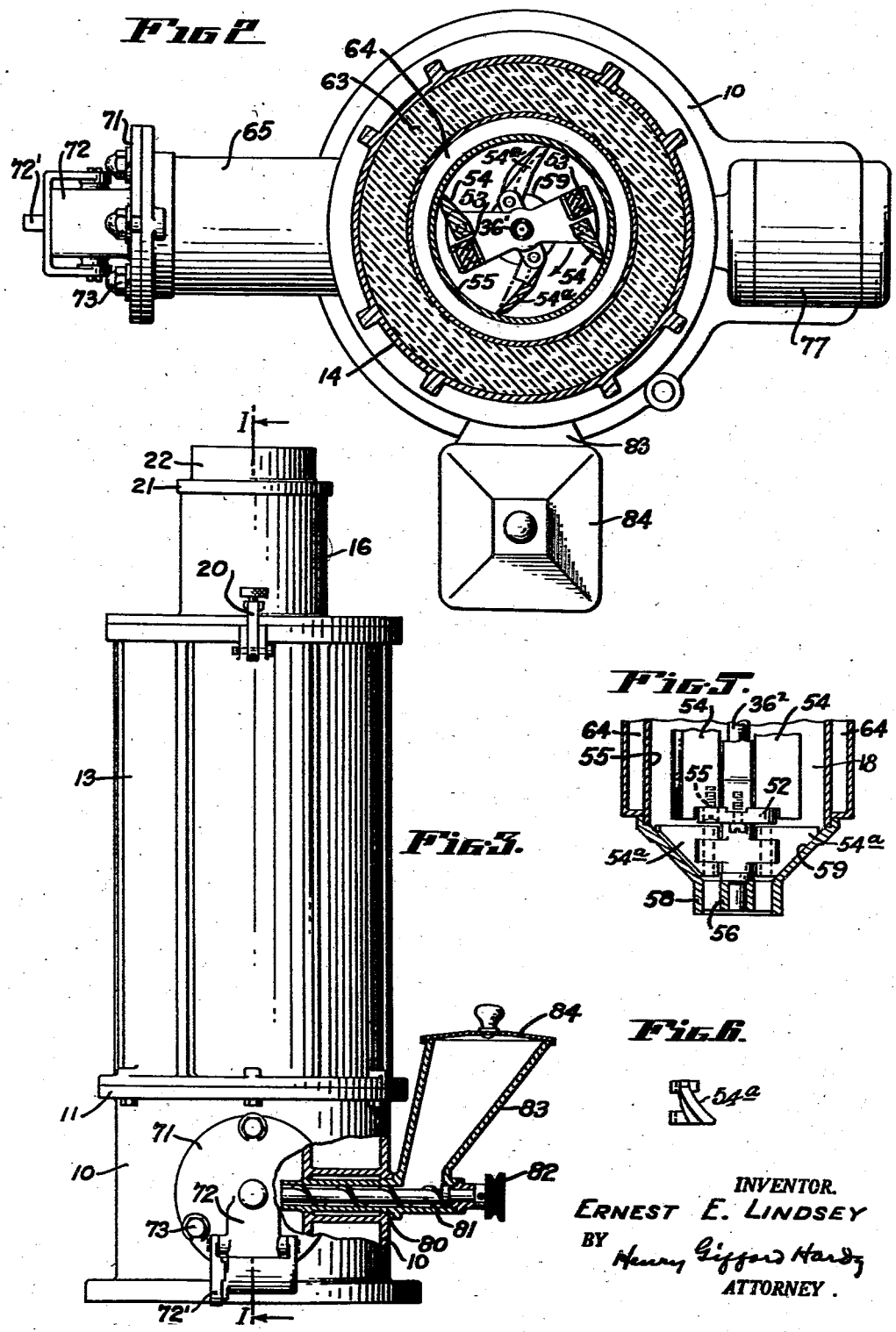

Patented May 12, 1942

2,282,662

UNITED STATES PATENT OFFICE 2,282,662

PROCESS AND APPARATUS FOR THE PREPARATION OF FROZEN CONFECTIONS

Ernest E. Lindsey, Los Angeles, Calif., assignor to Insta-Freeze Corporation, a corporation of California Application February 9, 1938, Serial No. 189,667

11 Claims. (Cl. 62—114)

This invention concerns a device for the making of frozen confections such as frozen fruit juices and syrups, ices, and ice creams, among others, the preparation of which results in different and palatable foods. More particularly the invention relates to a method for the continuous preparation of such frozen confections which is adaptable to single portion or even batch preparation.

It is now known that a better and more palatable frozen product is produced by applying the material to be frozen in as finely divided a form as possible and directing this against the freezing unit in order that immediate freezing may take place.

If these frozen particles are continuously removed from the refrigerated surface there is no opportunity for the frozen particles to enlarge and so make the confection grainy. Therefore, it is among the objects of the invention to provide a device in which the material to be frozen is directed to the freezing surface continuously in finely divided form so that the freezing of the material is instantaneous, producing minute ice crystals, and where the frozen material is continuously removed from the refrigerated surface.

The instantaneous freezing brings about a minimum size crystal and a uniformity which is not otherwise obtainable and results in a product which has a well defined smooth velvety texture. Furthermore, the device herein disclosed, produces this uniformity of result not only in the continuous freezing but at the different periods of operation.

The device of the invention prepares the confection in frozen form and delivers it ready for immediate consumption so that it may be served directly from the device itself. The material may also be collected in containers and hardened or stored in the conventional manner. Thus materials of the mix to be frozen may be continuously led into the device and the finished confection dispensed in individual portions or continuously as desired. The continuous dispensing is desirable for large operation where packaging in bulk is contemplated.

However, it is to be understood that the device is well adapted for batch production where the only difference is one of predetermined selection involving the amount of the mix which governs the portion or the batch dispensed.

Accordingly, among the objects of the invention is a provision of a device for the instantaneous production of frozen confections whereby a single batch may be continuously and instantaneously frozen and dispensed, or dispensed intermittently in individual portions after being prepared.

To increase the volume of the material produced and to provide a smooth creamy consistency of the product it may be aerated before delivery at the dispensing nozzle, which forms one of the objects and accomplishments of the device as well as the provision of other parts for the thorough intermingling and intermixing of chopped fruit, nuts, marshmallows, candies and the like, to give variety to the finished confection.

Such other objects as may become apparent as this description proceeds or which are inherently included in the device or within its capabilities are contemplated herein.

The invention resides in the combination and construction of parts illustrated in the accompanying two sheets of drawings which show the device in a preferred embodiment but it is to be understood that this is capable of modification and change of construction without departing from the spirit or the scope of the invention and that such changes are within the present purview.

Referring now to the drawings:

Figure 1 is a vertical section taken on the line I—I of Figure 3 and looking in the direction of the arrows.

Figure 2 is a transverse section taken on the line II—II of Figure 1 and looking in the direction of the arrows.

Figure 3 is a front elevation of the device with a portion broken away to expose a section of the auxiliary feed mechanism.

Figure 4 is an enlarged vertical section of a form of spray head.

Figure 5 is a reduced sectional detail of the scraping means.

Figure 6 is an elevation of one of the helical blades 54a which make up the helical screw feed.

In the description and on the drawings similar reference characters have been used to designate similar parts.

Although the drawings, taken as a group, represent the entire device in the preferred form, for the most part the general construction and operation is best understood by attention to Figure 1. The device is constructed upon a base portion 10 which is preferably a single casting of any desired shape but is here shown to be generally circular in plan. (See Figure 2.) The outer wall of the base 10 is provided with an outwardly extended lip 11 which may be recessed or stepped as at 12 in order to support the outer wall 13 of the cylindrical body portion 14. The juncture is held in firm engagement by any well-known means such as bolts 15.

Surmounting the body portion 14 is a turret-like gear housing 16 which has the double function of being a closure for the open top of the cylindrical portions of the device and a protective housing for the operating gears. This is hinged preferably, as by hinge 17, to the body portion in order that the interior of the chamber 18 may be accessible and is held in tight engagement during operation by any sort of locking means, here shown as thumbscrew clamp 20. To provide easy access to the gears, a gear housing cover 21 is placed at the top as the interior of this housing is arranged to prevent the possibility of grease, oil, or dirt getting into the inside of the device either during the operation or in the event the machine is stopped for repairs. The cover 21 may be provided with an upwardly extending annular wall 22 which will not only protect the entrance of the liquids being fed into the device and prevent a reasonable amount of overflow in the event of some failure but will also act as a support for batch delivery of materials to be frozen. It is also provided with a concentric opening 23 the center of which coincides with the longitudinal axis of the body portion 14. The operating gears are separated from the interior by an integral wall 24 suitably formed with an inner annular flange 25 which defines an aperture concentric with 23. Integrally with the gear housing 16 is provided an outwardly extending boss 26 and support 27 which is adapted as a support and mounting for the drive motor 28.

Within the casing of the motor 28 is a suitable reduction gear and a variable power take-off. Since any of a number of commercial forms may be used and since it forms no part of the present invention per se it is not shown herein. Shaft 30 on which bevel gear 31 is mounted, may be substantially a continuation of the shaft of motor 28. Sleeve shaft 33, on which is mounted pinion bevel gear 34, rotates at a very much reduced rate of speed around shaft 30 as controlled by the gear reduction take-off (not shown). Bevel gear 31 meshes with its counterpart, gear 32 and drives hollow shaft 36. The gear ratio shown is 1 to 1 so that the shaft 36 rotates at motor speed. However, it is to be understood that the rate of rotation can be controlled by the gearing as well as the motor although the latter is more desirable. Pinion 34 drives bevel gear 35 which is keyed to driving quill 37 which rotates around but independently of hollow shaft 36.

It will be seen that the driving quill 37 rotates within the flange 25 of the wall 24 of the gear housing 16 which acts as a bearing therefor and also as a stop for bevel gear 35 which drives the quill. Quill 37 is provided with an integral annular ring 38 which is adapted to be received in and revolve in a corresponding recess in the outer face of wall 24. On the face opposed to the location of ring 38, two or more driving pins 40 are positioned in such a manner as to be received in corresponding holes in spider 41 when the gear housing is positioned as shown in Figure 1.

So that the gear housing may be moved on its hinge 17 the hollow shaft 36 is broken at 42 and is joined with an identical extension 36'. At this juncture there is placed a suitable simple clutch 43 of any appropriate form, as any number of variations may be employed, to carry the same rotation to the shaft 36' when in operating position.

On the hollow shaft 36', which is concentric with the inner or freezing chamber 18 of the main body portion, are positioned one or more spray heads 44. The spray head rotates with the shaft 36' and is held in place in any well-known way such as a set screw 45 in the collar 46. The inside is hollowed so that when the spray head is in operating position it is provided with an inner chamber 47 which communicates with the inside of the hollow shaft 36' through suitable apertures 48. The exterior of the spray head is shaped with outwardly or radially extending angular directional fins 50 in the troughs of which are radially directed apertures 51 leading from the chamber 47. The size and the number of these apertures determines the amount of material directed, at any given speed of rotation. The shaft 36' is hollow until just below the openings 48 or the lowest group of openings 48 if more than one spray head is employed. From there on it becomes a solid shaft $36^2$ and is journaled with appropriate bearings at 51' in the spider 52.

At the extremities of spiders 41 and 52 are placed the spacer rods 53 and also the scraper blades 54 are journaled therein. The blades 54 are journaled off the longitudinal center so that in rotation the wider portion is thrown outwardly by the centrifugal force, although provided with suitable stops, and will scrape along the inner cylindrical wall 55 of the device. The spider 52 is mounted for rotating movement and is supported by member 56 and held coaxially in position by vanes or ribs 57 running to the bottom cylindrical portion 58 of the funnel-like member 59 which is open to the top.

The funnel-like member 59 rests upon and is held coaxially by support 60 and ribs 61 attached to and forming a part of the main base 10. The open top of the funnel-like member 59 supports the inner cylinder 55, which is the freezing surface, so that the inner faces of each present a flush continuous surface from top to bottom. Also rotating with spider 52 are discharge blades 54a at a helix angle of approximately 30°. A detail showing one of the blades 54a is illustrated in Figure 6 and its position is further indicated in Figures 2 and 5. These blades form the helical feed screw which rotates with the scraper blades 54 so that at the same time the material is being sprayed the frozen material is being removed and conveyed toward the delivery nozzle 72.

Between the outer wall 13 and the inner wall 55 of the device are two chambers 63 and 64. Chamber 64 is a closed chamber and is the zone wherein a refrigerant is circulated. It is connected at both top and bottom by suitable connections in the circulating system or piping of any well-known refrigerating system of which any one of a number of commercial systems are available and well adapted to this device. The connections are not shown because these involve simply the selection of the refrigerating system. Chamber 63 may be packed with a suitable insulating material for economy and ease of operation.

In the base portion 10 there is an integral additional cylindrical portion 65 arranged at right angles to the vertical axis of the device the axis of both intersecting at A. This portion will be referred to generally as the delivery cylinder and contains an inner cylindrical member 66 arranged coaxially therewith but spaced therefrom by means of spacer members 67 and 68 providing an air or insulating chamber 70 therebetween. The outer end of the delivery cylinder has a cover plate 71 with a suitable nozzle 72 and handle 72' for dispensing purposes, held firmly in place by screws 73 or any other eligible means. Shaft 74 is journaled for rotating movement in the cover plate 71 and positioned by suitable sleeve bearing 75 in boss 76 at the inner end of the delivery cylinder for direct power connection to the shaft of motor 77. The lower cylindrical portion 58 is projected downwardly so that it leads continuously into the delivery cylinder and specifically into cylinder 66. On the shaft 74 and preferably adjacent the inner end is mounted a whipper or beater 78 having a plurality of blades, which is rotated on shaft 74 by motor 77.

In Figures 2 and 3 is shown an additional feature which may or may not be incorporated in the final device. This consists of a tubular member 80 which fits into and is received by a cylindrical opening in the side of the base 10 at right angles to and preferably on the horizontal plane of the axis of the cylindrical portion 65. Within the member 80 a helical feed screw 81 rotates, the power being supplied externally through pulley 82. A hopper 83 with a suitable cover 84 is so arranged as to feed through an opening into the tubular member 80 and directly to the feed screw 81.

*Operation*

For the purpose of lucidity and ease of exposition the operation of the device will be described when functioning as a continuous freezer, and it will be assumed that the device is in operative position as shown in Figure 1 and that both motors 28 and 77 have been turned on and are running. Likewise, it will be assumed that there are two spray heads positioned as indicated on the drawings.

The mixture to be frozen is continuously conveyed by any acceptable means such as a pipe or the like to the upper end of the hollow shaft 36 which is rotating at the speed of motor 28 by means of bevel gears 31 and 32. Hollow shaft 36' and its solid extension 36² are rotating at an identical speed because of the clutch 43 operating the segments as a unit. The liquid mix flows by gravity down the interior of these hollow shafts 36 and 36' until stopped just below the lowermost group of perforations 48 and will then flow through them into the chamber 47 of the spray head 44 and centrifuged therein. The mix to be frozen is sprayed out of the chamber 47 by centrifugal force through the apertures 51. It will be observed that the apertures are directed so that a large expanse of the cylinder 55 may be coated for immediate freezing. The inner cylinder 55 is the refrigerated or freezing surface and is maintained during operation at a temperature sufficient to instantaneously freeze the particles of mix which are thrown against it by centrifugal force. This temperature is maintained by the circulation of a liquid or gaseous refrigerant preferably, through the chamber 64. The spray head delivers the mix in very finely divided form to the refrigerated surface so that freezing is instantaneous. Where liquid is atomized a tremendous amount of surface is exposed to the action of refrigeration before the atomized particles even reach the refrigerated surface, thus hastening the freezing action and producing crystals of even microscopic size.

As the shaft 36 is rotated rapidly at motor speed the other set of bevel gears 34 and 35 are rotating at a very much reduced rate controlled by the gear reduction take-off. An illustration of suitable speeds would be a motor speed of 1750 R. P. M. as against 125 R. P. M. for the outer gears. Obviously such a reduction by gears alone is not practicable because of the space limitations. Gear 35 being keyed to quill 25 and by means of driving pins 40 rotates the spiders 41 and 52 with the scraper blades 54 placed therebetween. As has been said the blades are so arranged that the centrifugal force of the rotation of the spiders is sufficient to keep them in such position as to continuously remove the solid or frozen mix from the wall 55 and place it in the funnel-like portion 59 from whence it is forced by gravity into the cylindrical end portion 57 and delivered to the dispensing tube 66 by the rotation of the helical discharge blades 54a. It is apparent that the syrup is continuously sprayed onto the freezing surface, instantaneously frozen, and continuously scraped off and that these things are being accomplished simultaneously during the entire operation.

Upon delivery of the frozen mixture to the delivery tube 66 it comes in contact with the blades of the beater or whipper 78 which not only aerates and fluffs the confection to a rich velvety texture but propels it along to the dispenser nozzle 72 where the dispensing may be controlled by lever 72' and other suitable means for continuous or intermittent dispensing. The length of the delivery tube 66 and its casing 65 is purely a matter of choice and the length shown in the drawings provides for the accumulation of a supply of the finished frozen confection ready for dispensing.

If the device has the modification of the hopper 83 and its associated members, chopped or whole fruits, nuts, candies and the like, may be placed therein and continuously fed into the frozen confection at the point where it is being aerated, by means of the screw conveyor 81. Thus these additions to the confection are thoroughly intermixed and distributed therein.

In addition to the continuous operation the device is quite as capable of functioning exactly in the manner above described for predetermined amounts of mix whether of a single portion or a larger batch.

In the foregoing disclosure reference has been made to the chamber 64, in which the refrigerant is circulated, as an open chamber for gaseous or liquid refrigerant. It is not to be understood that this is a limitation but rather an example of one means for refrigerating the cylinder 55. Any suitable means may be employed, including coils, but the best results have been obtained with the open chamber disclosed herein.

Quite obviously the aerator 78 may be a simple screw or other conveyor and eliminate the aeration. With this form the frozen confection as removed is delivered to the dispensing nozzle ready for immediate consumption if desired.

I claim:

1. In a device for the production of frozen confections, in combination, means for continuously supplying the material to be frozen to a refrigerated chamber, a walled refrigerated chamber, means for spraying said material in finely divided form against said wall for an instantaneous freezing, in successive layers and means for continuously removing said frozen material from said wall, said spraying and removing being continuous and simultaneous.

2. In a device for the production of frozen confections and the like, in combination, means for continuously supplying material to be frozen to a refrigerated chamber, a walled refrigerated chamber rotating means within said chamber operating at a comparatively high rate of speed for continuously sending said material in a finely divided form against said wall for instantaneous freezing, and rotating means also within said chamber operating at a comparatively low rate of speed for continuously removing said frozen material, said sending and removing being continuous and simultaneous.

3. A device for the production of frozen confections, comprising in combination, means for continuously supplying material to be frozen to a refrigerated chamber, a walled refrigerated chamber, rotating means within said chamber operating at a comparatively high rate of speed for continuously spraying said material in finely divided form against said wall for instantaneous freezing, rotating means also within the chamber operating at a comparatively low rate of speed for continuously removing the said frozen material, said spraying and removing being simultaneous, and means for aerating the removed frozen material before dispensing.

4. A device for the production of frozen confections, comprising in combination, means for continuously supplying material to be frozen to a refrigerated chamber, a walled refrigerated chamber, rotating means within said chamber operating at a comparatively high rate of speed for continuously spraying said material in finely divided form against said wall for instantaneous freezing, rotating means also within the chamber operating at a comparatively low rate of speed for continuously removing the said frozen material, said spraying and removing being simultaneous, and integrated means for adding a solid or semi-solid material from an outside source and thoroughly intermingling and aerating the material before dispensing.

5. In a device for the instantaneous freezing of confections comprising in combination, a refrigerated chamber and means for refrigerating said chamber, a vertical rotatable hollow shaft concentrically disposed with respect to said chamber, means on said shaft and rotatable therewith for centrifugal delivery of the material to be frozen and having openings therein for continuously and centrifugally throwing said material in a finely divided form against the refrigerated wall of said chamber for instantaneous freezing in successive layers, and a rotatable member for continuously removing the frozen material from said wall for delivery to a dispensing member, said centrifugal throwing and removing taking place simultaneously.

6. In a device for the instantaneous freezing of confections comprising in combination, a refrigerated chamber and means for refrigerating said chamber, a vertical rotatable hollow shaft concentrically disposed with respect to said chamber, means on said shaft and rotatable therewith at a comparatively high rate of speed for centrifugal delivery of the material to be frozen and having openings therein the size and number of which determine the amount for continuously and centrifugally spraying said material in finely divided form against the refrigerated wall of said chamber for instantaneous freezing, and a rotatable member mounted for a comparatively low rate of speed for continuously removing the frozen material from the wall of said chamber for delivery to a dispensing member, said centrifugal spraying and removing of the frozen material taking place simultaneously.

7. In a device for the instantaneous freezing of confections comprising in combination, a refrigerated chamber and means for refrigerating said chamber, a vertical rotatable hollow shaft concentrically disposed with respect to said chamber, means on said shaft and rotatable therewith at a comparatively high rate of speed having radially extending directional fins for centrifugal delivery of the material to be frozen and having openings therein the size and number of which determine the amount of material sprayed, for continuously and centrifugally spraying said material in finely divided form against the refrigerated wall of said chamber for instantaneous freezing, and a rotatable blade mounted for a comparatively low rate of speed for continuously removing the frozen material from the wall of said chamber for delivery to a dispensing member, said centrifugal spraying and removing of the frozen material taking place simultaneously.

8. In a device for the instantaneous production of frozen confections in combination with a refrigerated chamber and a refrigerant therefor, a rotatable shaft disposed concentrically with respect to said chamber, means mounted on said shaft and rotatable therewith for centrifugally delivering material to be frozen in finely divided state against the walls of said refrigerated chamber for instantaneous freezing, a rotatable member for continuously removing the frozen material from said chamber and rotatable means for whipping and aerating said frozen material before dispensing.

9. A method of preparing a frozen confection comprising the steps of continuously supplying material to be frozen to a refrigerated surface in a finely divided state so as to produce small, uniform ice crystals and instantaneous freezing in successive layers, and continuously removing said frozen material for immediate use, the supplying of the material and the removal of the frozen material being simultaneous.

10. The method of preparing a frozen confection comprising the steps of continuously supplying material to be frozen to a refrigerated surface in finely divided form so as to produce small, uniform ice crystals and instantaneous freezing, and continuously removing said frozen material and separately aerating said frozen material before dispensing, the supplying of the material and the removal of the frozen material taking place simultaneously.

11. The method of preparing a frozen confection comprising the steps of continuously supplying material to be frozen to a refrigerated surface in a finely divided state so as to produce small, uniform ice crystals and instantaneous freezing, continuously removing said frozen material, then separately adding edible solids or semi-solids to said frozen material, intimately intermixing and at the same time aerating the frozen confection and delivering the product for dispensing.

ERNEST E. LINDSEY.